United States Patent [19]
Okano

[11] Patent Number: 5,181,011
[45] Date of Patent: Jan. 19, 1993

[54] METHOD FOR CHECKING THE OPERABILITY OF SAFETY SYSTEM FOR VEHICLES

[75] Inventor: Masami Okano, Higashimatsuyama, Japan

[73] Assignee: Zexel Corporation, Tokyo, Japan

[21] Appl. No.: 744,414

[22] Filed: Aug. 31, 1991

[30] Foreign Application Priority Data

Aug. 14, 1990 [JP] Japan ................... 2-215251

[51] Int. Cl.$^5$ .................................. B60Q 1/00
[52] U.S. Cl. ................... 340/438; 340/436; 340/514; 280/734; 280/735; 180/282
[58] Field of Search .............. 340/436, 438, 514; 280/734, 735; 180/282, 271

[56] References Cited

U.S. PATENT DOCUMENTS

| | | | |
|---|---|---|---|
| 4,950,914 | 8/1990 | Kurihara et al. | 307/10.1 |
| 4,950,915 | 8/1990 | Spies et al. | 280/735 |
| 5,018,763 | 5/1991 | Okano et al. | 180/271 |
| 5,081,587 | 1/1992 | Okano | 280/735 |
| 5,083,276 | 1/1992 | Okano et al. | 340/436 |
| 5,122,954 | 6/1992 | Okano | 340/436 |
| 4,9990,884 | 2/1991 | McCurdy et al. | 280/735 |

FOREIGN PATENT DOCUMENTS

63-241467 10/1988 Japan .

Primary Examiner—Jin F. Ng
Assistant Examiner—Popovici Dov
Attorney, Agent, or Firm—Pollock, Vande Sande & Priddy

[57] ABSTRACT

A method for checking the operability of a vehicular safety system which comprises an acceleration sensor for providing a pair of differential output signals, a first and second vehicle collision discriminators having a differential amplifier responsive to the pair of differential output signals, respectively, a pair of current controllers responsive to the first and second distriminators, respectively, whereby a firing current is supplied to a firing actuator through the pair of current controllers when the vehicle collision is detected. The method is characterized in that one of the differential amplifier is changed in arrangement so as to be able to respond to an in-phase input, and a test signal for making the acceleration sensor produce pair of check signals in phase is applied to the acceleration sensor. Then the operability of the safety system is checked on the basis of the potential developed at the firing actuator at that time without the activation of the actuator.

8 Claims, 4 Drawing Sheets

METHOD FOR CHECKING THE OPERABILITY OF SAFETY SYSTEM FOR VEHICLES

BACKGROUND OF THE INVENTION

1. Field of the Invention

The present invention relates to a method for checking the operability of a vehicle safety system for activating a vehicular safety device such as an inflatable air bag or a safety belt tensioning device at the time of the occurrence of a collision of a vehicle to protect the driver and/or passenger(s).

2. Description of the Prior Art

The conventional safety system of this type is arranged to detect the sudden deceleration occurring at the time of vehicle collision on the basis of the integrated value of the vehicle acceleration detected by an acceleration sensor and to activate the safety device when the magnitude of the sudden deceleration has reached a prescribed level. Consequently, it is necessary for the safety system to ensure both the detection of the occurrence of the predetermined deceleration state produced by the vehicle collision and the activation of the safety device. Furthermore, it is also preferable for the system to constantly check the operability of the safety system during the running of the vehicle and to inform the driver of the result when the safety system has malfunctioned.

One example of an arrangement for realizing the foregoing requirements is disclosed in Japanese Patent Application Public Disclosure No. Sho 63-241467 (corresponding to U.S. Pat. No. 4,950,914) which describes a vehicle collision detection device having a self-check circuit. In this device a test pulse signal generator is operated to apply a test pulse to a piezo-electric element of the acceleration sensor for detecting impacts caused by vehicle collisions and it is checked whether or not a predetermined output signal is obtained at the output of the signal processing circuit for processing the output signal from the sensor in response to the application of the test pulse. However, this arrangement is not capable of checking the operability of the firing element.

SUMMARY OF THE INVENTION

It is an object of the present invention to provide an improved method for checking the operability of a vehicular safety system.

It is another object of the present invention to provide an operability checking method for vehicular safety systems, which is capable of reliably checking the operation status of a circuit between an acceleration sensor and a firing element without need for a complex circuit.

The method according to the present invention is for checking the operability of a vehicular safety system, which comprises a vehicle safety device; a firing member for activating the vehicle safety device; an acceleration sensing means for providing a pair of output signals which correspond to the acceleration of the vehicle but are opposite in phase from each other; a first discriminating means which includes a first differential amplifying means responsive to the acceleration sensing means for producing a first detection signal corresponding to the difference between the pair of output signals and discriminates the occurrence of collision of the vehicle in response to the first detection signal; a second discriminating means which includes a second differential amplifying means responsive to the acceleration sensing means for producing a second detection signal corresponding to the difference between the pair of output signals and discriminates the occurrence of collision of the vehicle in response to the second detection signal; a first current controlling means responsive to the first discriminating means for allowing a current to flow therethrough between one terminal of the firing member and a power source when the occurrence of a collision of the vehicle is discriminated by the first discriminating means; and a second current controlling means responsive to the second discriminating means for allowing a current to flow therethrough between the other terminal of the firing member and the power source when the occurrence of a collision of the vehicle is discriminated by the second discriminating means; whereby a firing current is allowed to flow through the firing member from the power source when both the first and second current controlling means are rendered operative at the same time. The method according to the present invention is characterized in that, at first, either the first or second differential amplifying means is changed in arrangement so as to be able to respond to an in-phase input, and a test signal for making the acceleration sensing means produce a pair of check signals in phase is applied to the acceleration sensing means. Then the operability of the safety system is checked on the basis of the potential developed at the firing member at that time.

In cases other than the operability checking operation, the first and second differential amplifying means do not respond to the in-phase input signals produced by the acceleration sensing means and provide output signals corresponding to the difference between the pair of output signals generated by the acceleration sensing means. An independent discriminating operation is made as to whether or not the vehicle has collided on the basis of the output signal from each of the first and second differential amplifying means in the first and second discriminating means, respectively. When both discriminating means simultaneously discriminate that a vehicle collision has occurred, the first and second current controlling means allow the firing current to flow through the firing member and electric power necessary for activating the safety device is supplied from the power source to the firing member, whereby the safety device is activated.

On the other hand, in the case where the operability of the safety system is checked, the circuit arrangement of either the first or second differential amplifying means is changed so as to be able to respond to the in-phase input signals. When the test signal is applied to the acceleration sensing means in this case, the current controlling means corresponding to the differential amplifying means responsive to the in-phase input signals allows the current to flow in response to a pair of in-phase output signals generated in phase by the acceleration sensing means, and the potential developed at the firing element changes. Since the status of the change in the potential is related to the status of the operability of the safety system, it is possible to check the operability of the safety system on the basis of the resulting condition of the changes in the potential. In this case, the other differential amplifying means does not respond to the pair of in-phase input signals, so that the corresponding current controlling means prevents the current from flowing. Thus, the operating current is reliably prevented from flowing through the firing member during the operation for checking the operability of the safety system. It is thus possible to check the operability of the circuit between the acceleration sensing means and the firing member without erroneously activating the firing member.

The invention will be better understood and other objects and advantages thereof will be more apparent from the following detailed description of a preferred embodiment with reference to the accompanying drawings.

DESCRIPTION OF THE PREFERRED EMBODIMENT

Figure 1:
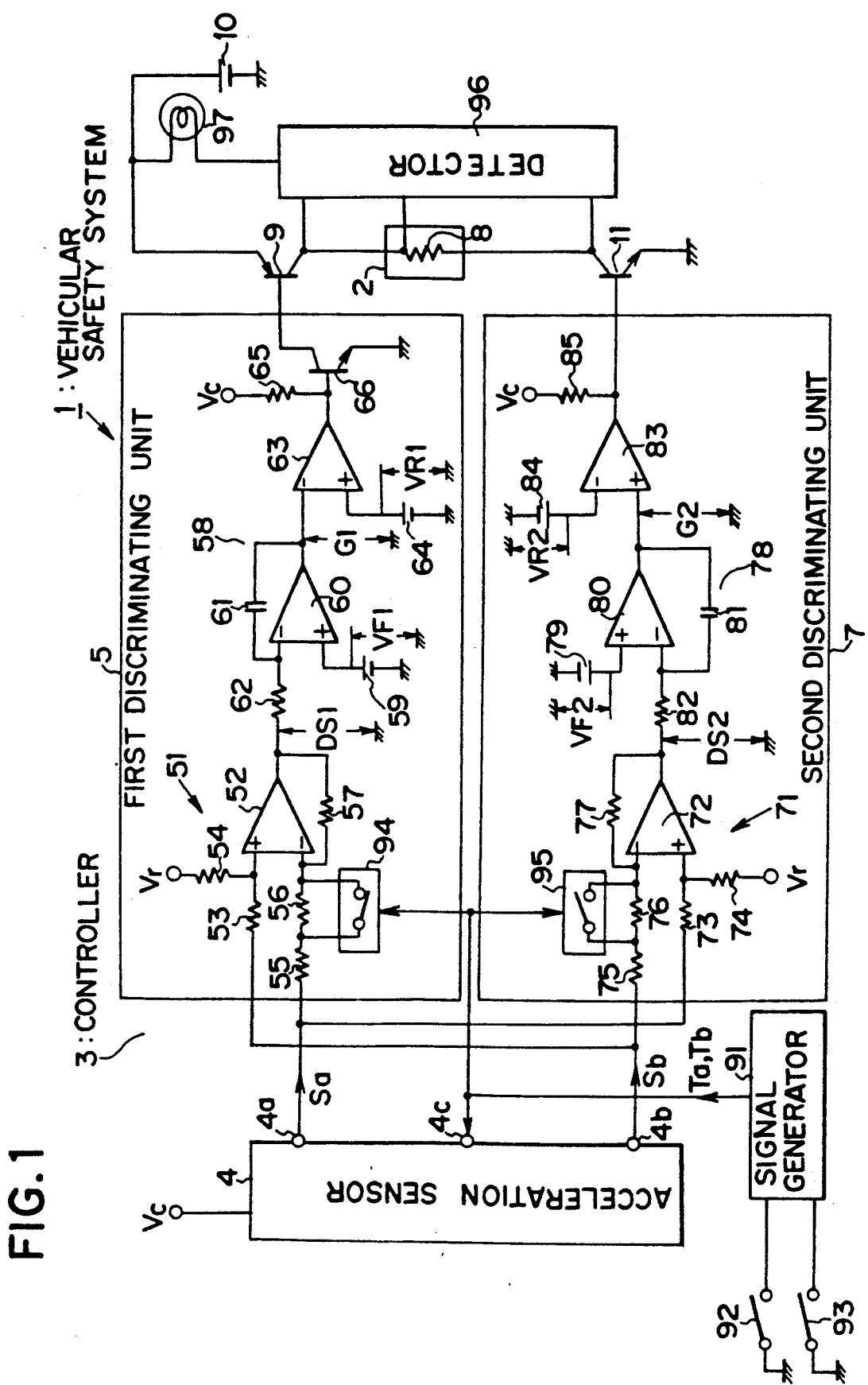
FIG. 1 is a schematic diagram of an embodiment of a vehicular safety system, the operability of which is checked by the method of the present invention.

FIG. 1 is an embodiment of a vehicular safety system arranged to be able to check its own operability by the method of the present invention. The vehicular safety system, designated by reference numeral 1, comprises an inflatable air bag 2 and a controller 3 for discriminating whether or not the vehicle (not shown) in which the air bag 2 is installed has collided and for activating the air bag 2 when the occurrence of a vehicle collision is determined.

For detecting the acceleration of the vehicle, the controller 3 has an acceleration sensor 4 with a pair of output terminals 4a and 4b. The acceleration sensor 4 outputs from the output terminal 4a a voltage signal having a level corresponding to the acceleration of the vehicle, which will be referred to as the first detection signal Sa. From the output terminal 4b it outputs a voltage signal which is identical in absolute level to the first detection signal Sa but is opposite to that in phase. This is the second detection signal Sb.

Figure 2:
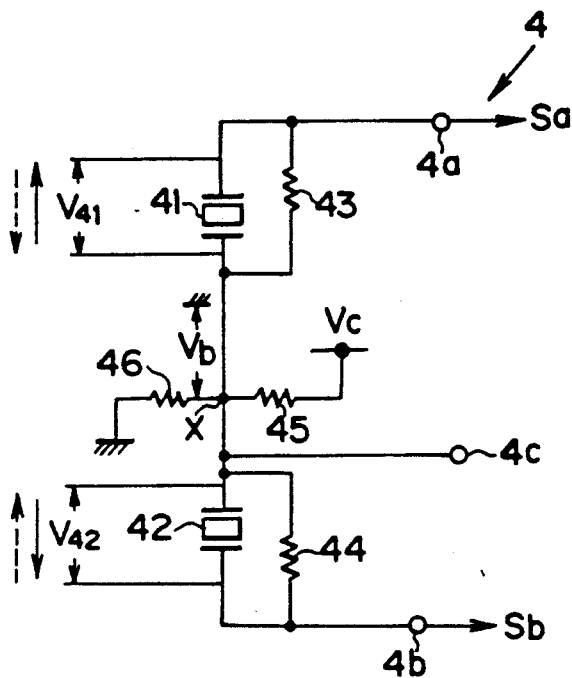
FIG. 2 is a schematic diagram of the acceleration sensor shown in FIG. 1.

As illustrated in FIG. 2, the acceleration sensor 4 has piezo-electric elements 41 and 42 and resistors 43 to 46, which are connected as shown in FIG. 2. A bias voltage Vb obtained by dividing a source voltage Vc by use of the resistors 45 and 46 is applied to a common connecting point X of the terminals on one side of the piezo-electric elements 41 and 42. In this embodiment, the level of the bias voltage Vb is set to exactly half the level of the source voltage Vc.

Figure 3:
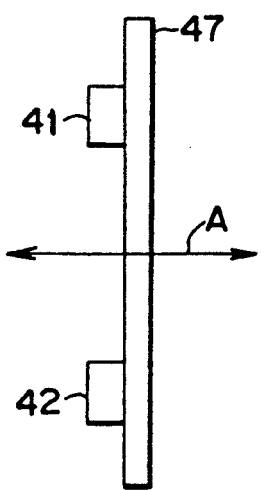
FIG. 3 is a view illustrating an arrangement of the piezo-electric elements shown in FIG. 2.

Referring to FIG. 3, the piezo-electric elements 41 and 42 are mounted on a common base plate member 47, made from an appropriate rigid material. The base plate member 47 is rigidly mounted at an appropriate portion of the vehicle so as to extend perpendicularly to the running direction of the vehicle. As a result, the piezo-electric elements 41 and 42 are tensed or compressed in correspondence to the acceleration or deceleration of the vehicle, and produce corresponding voltages.

Voltages thus appear at the other side terminals of the piezo-electric elements 41 and 42, at levels equal to the sum of the bias voltage Vb and the corresponding voltage component produced by the piezo-electric elements 41 or 42 in correspondence to the acceleration/deceleration of the vehicle. The resulting voltages are output as the first detection signal Sa and the second detection signal Sb from the output terminals 4a and 4b, respectively.

In this case, the first detection signal Sa is synchronized with the second detection signal Sb since identical inertial forces are applied to the piezo-electric elements 41 and 42 when the vehicle is accelerated or decelerated. In this embodiment, since the piezo-electric elements 41 and 42 are rigidly mounted on the common base plate member 47, shock and vibration caused by vehicle collisions are transmitted through the base plate member 47 to the piezo-electric elements 41 and 42 at the same time, whereby the voltage components generated by the piezo-electric elements 41 and 42 in response to shocks are in precise synchronization.

Figure 4:
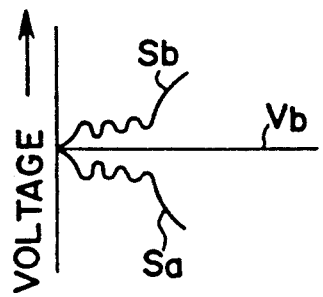
FIG. 4 is a view illustrating waveforms of the output signals generated by the acceleration sensor.

However, since the piezo-electric elements 41 and 42 are connected in such a manner that the direction of the output voltage $V_{41}$ is opposite to that of the output voltage $V_{42}$ with respect to the common connecting point X as shown in FIG. 2, the output voltages $V_{41}$ and $V_{42}$ are opposite in phase with respect to the bias voltage Vb. Thus, the detection signals Sa and Sb are equal in level with respect to the bias voltage Vb. During the negative acceleration produced at the time of a the vehicle collision, the level of the first detection signal Sa becomes lower than that of the bias voltage Vb and the level of the second detection signal Sb becomes higher than that of the bias voltage Vb as illustrated in FIG. 4.

The absolute values of the differences between the voltages of each of these detection signals and the bias voltage, in other words, the absolute values of the voltage components produced in the respective piezo-electric elements 41 and 42 owing to the vehicle deceleration, are ΔV since the characteristics of these piezo-electric elements 41 and 42 are identical. Accordingly, the first and second detection signals Sa and Sb can be shown as follows:

$$Sa = -\Delta V + Vb \tag{1}$$

$$Sb = \Delta V + Vb \tag{2}$$

As will be understood for the foregoing description, the level of the first detection signal Sa becomes higher than that of the bias voltage Vb and the level of the second detection signal Sb becomes lower than that of the bias voltage Vb when the vehicle is in a positive acceleration condition.

The reference symbol 4c in FIG. 2 designates an input terminal to which a test signal, which is described later, is applied, and the test signal supplied to the input terminal 4c is applied to the connecting point X.

Returning to FIG. 1, the controller 3 has a first discriminating unit 5 and a second discriminating unit 7, which are for discriminating whether or not the vehicle has collided on the basis of the pair of detection signals Sa and Sb generated by the acceleration sensor 4.

The first discriminating unit 5 has a differential amplifying circuit 51 which is arranged to produce an output corresponding to the difference between the first detection signal Sa and the second detection signal Sb. The differential amplifying circuit 51 is composed of an operational amplifier 52 and resistors 53 to 57, and the first detection signal Sa is applied through the resistors 55 and 56 to a negative input terminal of the operational amplifier 52. The second detection signal Sb is applied through the resistor 53 to a positive input terminal of the operational amplifier 52 and a prescribed reference voltage Vr is applied through the resistor 54 to the positive input terminal thereof. The resistor 57 is connected as a feedback resistor between the negative input terminal and an output terminal of the operational amplifier 52.

In the differential amplifying circuit 51 arranged as described above, the values of the elements are determined in such a way that the output level does not respond to in-phase input signals. Accordingly, the differential amplifying circuit 51 is responsive to the first and second detection signals Sa and Sb to produce a first differential output voltage $DS_1$ representing the difference between the first and second detection signals Sa and Sb, and the first differential voltage $DS_1$ is applied to an integrating circuit 58.

The integrating circuit 58 is of well-known design and comprises an operational amplifier 60 having a positive input terminal to which an off-set voltage $VF_1$ is applied by a voltage source 59, a capacitor 61 and a resistor 62. A first integrated output voltage $G_1$ obtained by integrating the first differential output voltage $DS_1$ is derived from the integrating circuit 58 and is applied to a negative input terminal of a voltage comparator 63.

The voltage comparator 63 has a positive input terminal to which a reference voltage $VR_1$ is supplied by a voltage source 64 and the output level of the voltage comparator 63 becomes high when the first integrated output voltage $G_1$ is lower in level than the reference voltage $VR_1$, whereby a transistor 66 having a base electrode to which the source voltage Vc is applied through a resistor 65 is turned on and the potential of the collector of the transistor 66 falls to ground level.

Consequently, when the vehicle is decelerated due to a collision, the level of the first differential output voltage $DS_1$ increases, so that the level of the first integrated output voltage $G_1$ decreases. Then, the transistor 66 is turned on when the level of the first integrated output voltage $G_1$ becomes smaller than that of the reference voltage $VR_1$. That is, the first discriminating unit 5 discriminates that the vehicle may have collided when $G_1$ becomes lower than $VR_1$.

Description will now be given to the second discriminating unit 7.

The second discriminating unit 7 has a differential amplifying circuit 71 which is arranged to produce an output corresponding to the difference between the first detection signal Sa and the second detection signal Sb. The differential amplifying circuit 71 is composed of an operational amplifier 72 and resistors 73 to 77, and the second detection signal Sb is applied through the resistors 75 and 76 to a negative input terminal of the operational amplifier 72. The first detection signal Sa is applied through the resistor 73 to a positive input terminal of the operational amplifier 72 and the prescribed reference voltage Vr is applied through the resistor 74 to the positive input terminal thereof. The resistor 77 is connected as a feedback resistor between the negative input terminal and an output terminal of the operational amplifier 72.

In the differential amplifying circuit 71 arranged as described above, the values of the elements are also determined in such a way that the output level does not respond to in-phase input signals. Accordingly, the differential amplifying circuit 71 is responsive to the first and second detection signals Sa and Sb to produce a second differential output voltage $DS_2$ representing the difference between the first and second detection signal Sa and Sb, and the second differential output voltage $DS_2$ is applied to an integrating circuit 78.

As will be understood from FIG. 4, when the vehicle is suddenly decelerated due to a collision, since the potential at the positive input terminal of the operational amplifier 72 becomes greater in the negative direction while the potential at the negative input terminal thereof becomes greater in the positive direction, it follows that the level of the second differential output voltage $DS_2$ changes so as to be lowered.

The integrating circuit 78 is of well-known design and comprises an operational amplifier 80 having a positive input terminal to which an off-set voltage $VF_2$ is applied by a voltage source 79, a capacitor 81 and a resistor 82. A second integrated output voltage $G_2$ obtained by integrating the second differential output voltage $DS_2$ is derived from the integrating circuit 78 and is applied to a positive input terminal of a voltage comparator 83.

The voltage comparator 83 has a negative input terminal to which a reference voltage $VR_2$ is provided by a voltage source 84 and the output level of the voltage comparator 83 becomes high when the integrated output voltage $G_2$ is greater in level than the reference voltage $VR_2$.

Consequently, when the vehicle is decelerated due to a collision, the level of the second differential output voltage $DS_2$ decreases, so that the level of the second integrated output voltage $G_2$ increases. Then, the output level of the voltage comparator 83 becomes high when the level of the second integrated output voltage $G_2$ becomes greater than that of the reference voltage $VR_2$. That is, the second discriminating unit 7 discriminates that the vehicle may have collided when $G_2$ becomes greater than $VR_2$.

One terminal of an electrically fired actuator 8 serving as the firing member of the air bag 2 is connected with the positive terminal of a battery 10 through a transistor 9 whose conductivity is controlled in accordance with the output of the first discriminating unit 5, and the other terminal of the electrically fired actuator 8 is connected with the negative terminal of the battery 10 through a transistor 11 whose conductivity is controlled in accordance with the output of the second discriminating unit 7.

Accordingly, if the transistor 9 is turned on in response to the discrimination of a vehicle collision in the first discriminating unit 5 and at the same time the transistor 11 is also turned on in response to the discrimination of a vehicle collision in the second discriminating unit 7, the current necessary for activating the electrically fired actuator 8 is supplied thereto from the battery 10, whereby the air bag can be inflated.

Description will now be given to the arrangement for checking the operability of the vehicle safety system 1 at any time.

Figure 5:
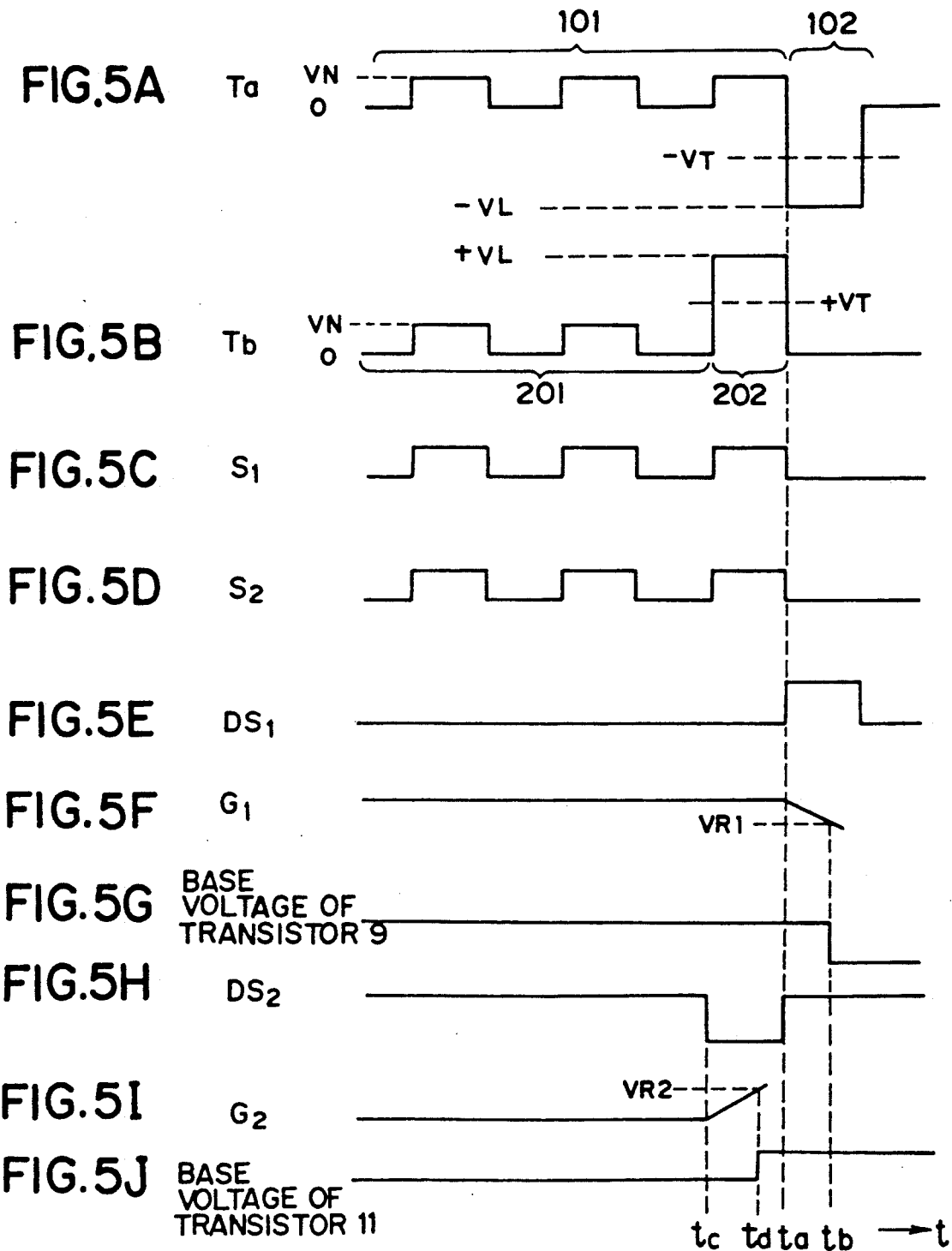
FIGS. 5A to 5J are waveform charts for describing the operation of the safety system shown in FIG. 1 in the case of checking the operability of the system.

In FIG. 1, reference numeral 91 designates a signal generator for generating test signals for checking the operability of the system 1. The signal generator 91 has switches 92 and 93 and is arranged to generate a first test signal Ta (FIG. 5A) for checking a system including the first discriminating unit 5 when the switch 92 is closed and to generate a second test signal Tb (FIG. 5B)

for checking another system including the second discriminating unit 7 when the switch 93 is closed.

The first and second test signals Ta and Tb produced by the signal generator 91 are supplied to the input terminal 4c of the acceleration sensor 4, and furthermore to switches 94 and 95 as opening/closing control signals.

The switch 94 is connected in parallel with the resistor 56 connected to the negative input terminal of the differential amplifier 52 and is arranged to close only when the level of the applied test signal is lower than $-VT$. The differential amplifying circuit 51 is not responsive to in-phase input signals of identical level when the switch 94 is open, while the differential amplifying circuit 51 is responsive even to in-phase input signals of identical level when the switch 94 is closed to short the resistor 56 and change its gain.

Another switch 95 is also connected in parallel with the resistor 76 connected to the negative input terminal of the operational amplifier 72 for the same purpose as that of the switch 94. However, the switch 95 is different from the switch 94 in that it is closed only when the level of the applied test signal is greater than $+VT$. The differential amplifying circuit 71 is also not responsive to the in-phase input signals of identical level when the switch 95 is open, while the differential amplifying circuit 71 is responsive even to in-phase input signals of identical level when the switch 95 is closed to short the resistor 76 and change its gain.

Reference numeral 96 designates a detector for detecting the potential developed in a wiring arrangement including the electrically fired actuator 8. The detector 96 is arranged to control the ON/OFF state of a lamp 97 connected therewith in accordance with the condition of the potential developed in the wiring arrangement in order to visually indicate the operability of the circuit between the acceleration sensor 4 and the electrically fired actuator 8 and the condition of the wiring arrangement.

Figure 6:
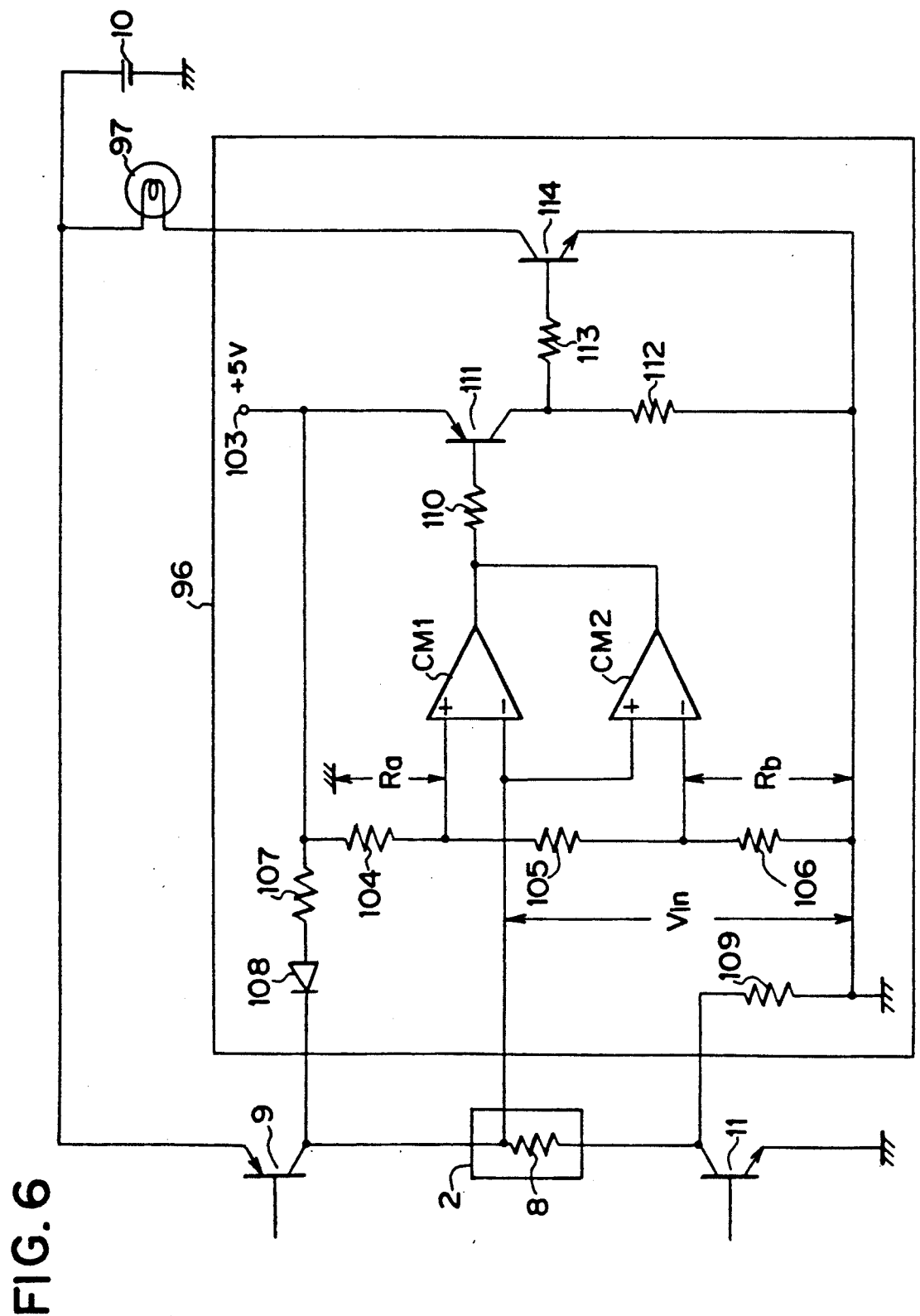
FIG. 6 is a schematic diagram of the detector shown in FIG. 1.

Referring to FIG. 6, the voltage developed between one terminal of the electronically fired actuator 8 and ground is applied as an input voltage Vin to the negative input terminal of a comparator CM1 of the open-collector type and the positive input terminal of a comparator CM2 of the open-collector type. These comparators CM1 and CM2 receive an d.c. electric power from the battery 10. Resistors 104 to 106 are connected in series between a stabilized d.c. 5 volts output terminal 103 and ground to provide divided voltages Ra and Rb, which are applied to a positive input terminal of the comparator CM1 and a negative input terminal of the comparator CM2 respectively.

A resistor 107 and a diode 108 are connected in series between the output terminal 103 and the collector of the transistor 9, and the collector of the transistor 11 is grounded through a resistor 109. As a result, current is allowed to flow constantly from the output terminal 103 to ground through the resistor 107, the diode 108, the electrically fired actuator 8 and the resistor 109. However, since the resistance values of the resistors 107 and 109 are determined in such a manner that the level of the current is too low to activate the electrically fired actuator 8. Accordingly, the air bag 2 is not inflated in response to the current supplied from the output terminal 103 to the electrically fired actuator 8.

The output terminals of the comparators CM1 and CM2 are connected through a resistor 110 to the base of a transistor 111, the emitter of which is connected to the output terminal 103. The collector of the transistor 111 is grounded through a resistor 112 and is further connected through a resistor 113 to the base of a transistor 114, the emitter of which is grounded. The collector of the transistor 114 is connected through the lamp 97 with the positive terminal of the battery 10.

The resistance values of the resistors 104, 105, 106, 107 and 109 are determined in such a way that Ra is greater than Vin and Vin is greater than Rb in the case where each of the transistors 9 and 11 is in its non-conductive state and the wiring arrangement including the electrically fired actuator 8 is in normal condition.

Consequently, when the safety system 1 has not malfunctioned in its stand-by condition, the output level of both comparators CM1 and CM2 is high so that the transistor 111 is turned off. Thus, the transistor 114 is also turned off and the lamp 97 is switched off. In contrast, in the case where a disconnection has occurred in the wiring arrangement including the electrically fired actuator 8, the level of the input voltage Vin becomes ground level or $+5$ volts and causes the output level in one of the comparators CM1 and CM2 to be low. As a result, both transistors 111 and 114 are turned on and the lamp 97 is lit.

Namely, the lamp 97 is turned on to indicate the existence of the malfunction when the a disconnection has occurred in the wiring arrangement including the electrically fired actuator 8 in the stand-by condition of the safety system 1.

Description will now be given to the operation of checking the operability of the vehicle safety system 1, which is carried out by the application of the first and second test signals Ta and Tb.

When the first test signal Ta is applied to the input terminal 4c of the acceleration sensor 4, a first signal $S_1$ shown in FIG. 5C is output from the output terminal 4a and a second signal $S_2$ shown in FIG. 5D is output from the output terminal 4b. During a first stage 101 of the first test signal Ta, the switch 94 is not closed because the lower limit of the level of the first test signal Ta is greater than $-VT$ and the upper limit thereof is lower than $+VT$. Therefore, the level of the first differential output voltage $DS_1$ is approximately zero, which is lower than that of the off-set voltage $VF_1$, and the first integrated output voltage $G_1$ is small. As a result, $G_1$ is smaller than $VR_1$.

When the state of the first test signal Ta changes from the first stage 101 to a second stage 102 at ta under the foregoing condition, the switch 94 is closed to short the resistor 56 owing to the fact that the level of the first test signal Ta becomes $-VL$, which is lower than $-VT$. As a result, the gain of the differential amplifier 51 increases to increase the level of the first differential output voltage $DS_1$ as illustrated in FIG. 5E. Thus, the level of the integrated output voltage $G_1$ gradually decreases after $t_a$, and reaches $VR_1$ at $t_b$ (FIG. 5F). After this, the transistor 9 is in its conductive state because of the low level at the base of the transistor 9 (FIG. 5G).

In this case, the switch 95 is kept open because the level of the first test signal Ta does not exceed $+VT$. Consequently, the second differential output voltage $DS_2$ is maintained at high level even if the test signal shown in FIGS. 5C or 5D is applied to the second discriminating unit 7, whereby the transistor 11 is maintained in non-conductive state.

When the potential at one terminal of the electrically fired actuator 8 changes owing to turn-on of only the transistor 9, the detector 96 detects the potential change and turns on the lamp 97. Specifically, as will be understood from FIG. 6, since the positive terminal voltage of the battery 10, which is greater than 5 volts, is applied to one terminal of the electrically fired actuator 8 when only the transistor 9 is turned on, Vin becomes greater than Va so that the output level of the comparator CM1 becomes low. As a result, the transistors 111 and 114 are turned on to put on the lamp 97. If the expected potential change, which causes the lamp 97 to turn on, does not occur in response to the application of the first test signal Ta, it is assumed that the circuit between the acceleration sensor 4 and the transistor 9 has malfunctioned.

Next, explanation will be given to the check of the operability of the circuit between the acceleration sensor 4 and the transistor 11 by the use of the second test signal Tb.

When the second test signal Tb is applied to the input terminal 4c of the acceleration sensor 4, a first signal $S_1$ shown in FIG. 5c is output from the output terminal 4a and a second signal $S_2$ shown in FIG. 5D is output from the output terminal 4b, similarly to the case of applying the first test signal Ta.

During a first stage 201 of the second test signal Tb, the switch 95 is not closed because the lower limit of the level of the second test signal Tb is greater than $-VT$ and the upper limit thereof is lower than $+VT$. Therefore, the level of the second differential output voltage $DS_2$ is approximately equal to the source voltage, which is higher than the off-set voltage $VF_2$. As a result, the second integrated output voltage $G_2$ is approximately zero and $G_2$ is lower than $VR_2$.

When the state of the second test signal Tb changes from the first stage 201 to a second stage 202 at time tc under the foregoing condition, the switch 95 is closed to short the resistor 76 owing to the fact that the level of the second test signal Tb becomes $+VL$, which is higher than $+VT$. As a result, the gain of the differential amplifying circuit 71 increases to decrease the level of the second differential output voltage $DS_2$ as illustrated in FIG. 5H. Thus, the level of the second integrated output voltage $G_2$ gradually increases after $t_c$, and reaches $VR_2$ at $t_d$. After this the transistor 11 is in its conductive state because of the low level at its base (FIG. 5J).

In this case, the switch 94 is kept open because the level of the second test signal Tb does not go below $-VT$. Consequently, the level of the first differential output voltage $DS_1$ is maintained approximately at the ground level even if the test signal shown in FIGS. 5C or 5D is applied to the first discriminating unit 5, whereby the transistor 9 is maintained in non-conductive state.

When the potential at one terminal of the electrically fired actuator 8 changes owing to turn-on of only the transistor 11, the detector 96 detects the potential change and turns on the lamp 97. Specifically, as will be understood from FIG. 6, since one terminal of the electrically fired actuator 8 is substantially grounded when only the transistor 11 is turned on, Vin becomes lower than Vb so that the output level of the comparator CM2 becomes low. As a result, the transistors 111 and 114 are turned on to put on the lamp 97. If the expected potential change, which causes the lamp 97 to turn on, does not occur in response to the application of the second test signal Tb, it is assumed that the circuit between the acceleration sensor 4 and the transistor 11 has malfunctioned.

With the arrangement of the vehicle safety system 1 shown in FIG. 1, only a simple additional circuit is needed for independently checking the circuit between the acceleration sensor 4 and the transistor 9 for firing control and the circuit between the acceleration sensor 4 and the transistor 11 for firing control. Accordingly, erroneous activation of the electrically fired actuator 8 during the checking operation can be prevented, and a highly reliable checking operation can be conducted without erroneous activation of the safety device.

In this embodiment, the test signal is simultaneously applied to the switches 94 and 95 whose conditions for closing operation are different from each other, and only one switch associated with the circuit being checked is closed. However, the present invention is not limited to the foregoing arrangement. For example, it is alternatively possible to use the same type switches for the switches 94 and 95 if a test signal is applied at different time to the switches associated with the discriminating circuit being checked.

What is claimed is:

1. A method for checking operability of a vehicle safety system, which comprises a vehicle safety device; a firing member for activating said vehicle safety device; an acceleration sensing means for providing a pair of output signals which correspond to acceleration of a vehicle but are opposite in phase from each other; a first discriminating means which includes a first differential amplifying means responsive to said acceleration sensing means for producing a first detection signal corresponding to the difference between the pair of output signals and discriminates occurrence of collision of the vehicle in response to the first detection signal; a second discriminating means which includes a second differential amplifying means responsive to said acceleration sensing means for producing a second detection signal corresponding to the difference between the pair of output signals and discriminates the occurrence of collision of the vehicle in response to the second detection signal; a first means responsive to said first discriminating means for allowing a current to flow therethrough between one terminal of said firing member and a power source when the occurrence of collision of the vehicle is discriminated by said first discriminating means; and a second means responsive to said second discriminating means for allowing a current to flow therethrough between the other terminal of said firing member and the power source when the occurrence of collision of the vehicle is discriminated by said second discriminating means; whereby a firing current is allowed to flow through said firing member from the power source when both said first and second means are rendered operative at the same time, said method comprising the steps of:

causing said acceleration sensing means to produce a pair of check signals which are identical;

making a circuit change in one of said first and second differential amplifying means to enable it to respond to an in-phase input;

detecting whether or not a potential difference is developed across said firing member in response to application of the check signals to said first and second differential amplifying means; and discriminating the operability of said vehicle safety system from a result obtained in said detecting steps.

2. A method as claimed in claim 1, wherein the circuit change is made by changing a value of a circuit element of said first or second differential amplifying means, whereby one of said first and second differential amplifying means is changed in the arrangement so as to be able to respond to an in-phase input.

3. A method as claimed in claim 2, wherein the circuit element is bridged by a switching means to substantially change the value of the circuit element.

4. A method as claimed in claim 1, wherein a test signal is applied to said acceleration sensing means to produce the pair of check signals.

5. A method as claimed in claim 4, wherein a value of at least one circuit element of said first or second differential amplifying means is changed, whereby one of said first and second differential amplifying means is rendered responsive to an in-phase input.

6. A method as claimed in claim 5, wherein the circuit element is bridged by a switching means to substantially change the value of the circuit element.

7. A method as claimed in claim 6, wherein the test signal is also applied to the switch means to close the same, whereby one of said first and second differential amplifying means is rendered responsive to the check signals.

8. A method for checking operability of a vehicle safety system, which comprises a vehicle safely device; a firing member for activating said vehicle safety device; an acceleration sensing means for providing a pair of output signals which correspond to acceleration of a vehicle but are opposite in phase from each other; a first discriminating means which includes a first differential amplifying circuit means responsive to said acceleration sensing means for producing a first detection signal corresponding to the difference between the pair of output signals and discriminates occurrence of collision of the vehicle in response to the first detection signal; a second discriminating means which includes a second differential amplifying circuit means responsive to said acceleration sensing means for producing a second detection signal corresponding to the difference between the pair of output signals and discriminates the occurrence of collision of the vehicle in response to the second detection signal; a first means responsive to said first discriminating means for allowing a current to flow therethrough between one terminal of said firing member and a power source when the occurrence of collision of the vehicle is discriminated by said first discriminating means; and a second means responsive to said second discriminating means for allowing a current to flow therethrough between the other terminal of said firing member and the power source when the occurrence of collision of the vehicle is discriminated by said second discriminating means; whereby a firing current is allowed to flow through said firing member from the power source when both said first and second means are rendered operative at the same time, said method comprising the steps of:

causing said acceleration sensing means to produce a pair of check signals which are identical;

making a circuit change in said first differential amplifying circuit means to enable it to respond to an in-phase input;

detecting whether or not a potential difference is developed across said firing member in response to the circuit change in said first differential amplifying circuit means;

canceling the circuit change in said first differential amplifying circuit means to make it unable to respond to an in-phase input;

changing a circuit arrangement of said second differential amplifying circuit means so as to be able to respond to an in-phase input; and detecting whether or not a potential difference is developed across said firing member in response to the circuit change in said second differential amplifying circuit means; whereby one system for actuating said first means and another system for actuating said second means are checked independently at different times.

* * * * *

UNITED STATES PATENT AND TRADEMARK OFFICE
CERTIFICATE OF CORRECTION

PATENT NO. : 5,181,011
DATED : January 19, 1993
INVENTOR(S) : Masami Okano

It is certified that error appears in the above-identified patent and that said Letters Patent is hereby corrected as shown below:

Column 10, line 68, change "steps" to --step--.

Signed and Sealed this

Twenty-sixth Day of October, 1993

Attest:

BRUCE LEHMAN

Attesting Officer

Commissioner of Patents and Trademarks